United States Patent [19]

Strien

[11] 4,190,290
[45] Feb. 26, 1980

[54] HEADREST FOR VEHICLE SEATS

[75] Inventor: Werner Strien, Stuttgart, Fed. Rep. of Germany

[73] Assignee: Recaro GmbH & Co., Kirchheim, Fed. Rep. of Germany

[21] Appl. No.: 1,831

[22] Filed: Jan. 8, 1979

[30] Foreign Application Priority Data

Jan. 12, 1978 [DE] Fed. Rep. of Germany ....... 2801168

[51] Int. Cl.² .............................................. A47C 1/10
[52] U.S. Cl. .................................................. 297/408
[58] Field of Search .............................. 74/99 R, 107; 297/406–409

[56] References Cited

U.S. PATENT DOCUMENTS

| 2,932,473 | 4/1960 | Kass et al. | 74/107 X |
| 3,695,700 | 10/1972 | Flach | 297/408 |

Primary Examiner—James C. Mitchell
Attorney, Agent, or Firm—Wigman & Cohen

[57] ABSTRACT

The invention relates to a device for setting elements which are pivotable relative to each other, especially for setting the pivotable upholstery support of a headrest for vehicle seats, having at least two elements which are not movable in the direction of the axis of rotation which are movable relative to each other about the axis of rotation and at least one setting member which form-fittingly locks these elements in the desired rotational position.

12 Claims, 9 Drawing Figures

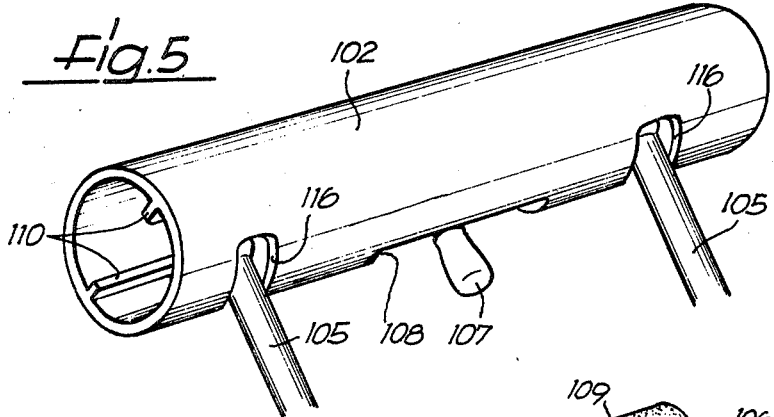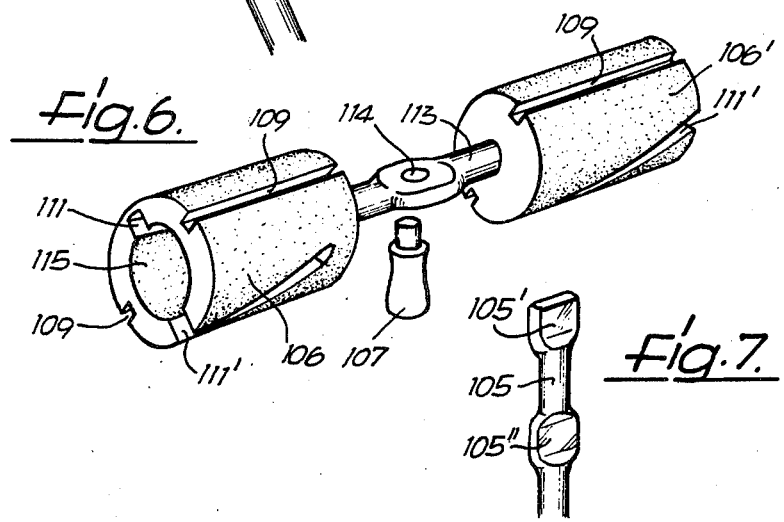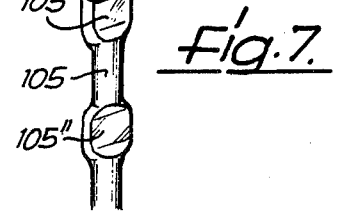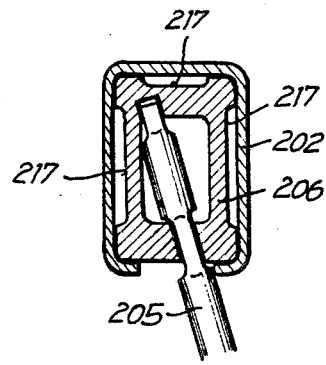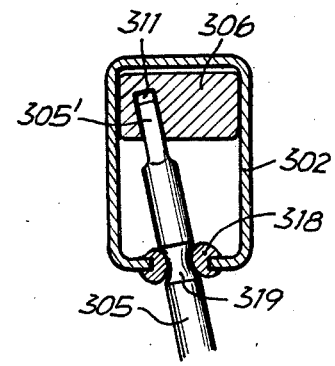

HEADREST FOR VEHICLE SEATS

BACKGROUND OF THE INVENTION

In headrests for vehicle seats, as a rule the upholstery support is held between the pivotable portions of the pivot mount in the desired rotational position by means of friction. To prevent unintentional changes in the rotational position of the headrest, however, the frictional force has to be chosen great enough, so that the user of the seat must exert a relatively large force to change the rotational position, and this is disturbing.

It is indeed also known to adjust the desired rotational position of the upholstery support by means of form-fitting, engaging setting members. The force exerted by the user during an adjustment is low with such a headrest. But this carries with it the disadvantage that no stepless adjustment of the rotational position is possible and that the rotational position can be unintentionally changed when there is an impact on the headrest. To loosen the locking mechanism of this type of headrest, the upholstery support together with the upholstery element supported thereby must be pushed in a radial direction with regard to the axis of rotation. This type of shifting, however, can also result from the effective force of an impact on the headrest.

SUMMARY AND OBJECTS OF THE INVENTION

A basic objective of the invention is to create a device of the above-mentioned type, which allows a stepless adjustment while still being embodied in a simple and space-saving manner.

Because the shifting of the setting member in the hollow body can take place in a stepless manner, a stepless adjustment of the inclined position of the hollow body relative to the element which engages therein is also possible. Because the two elements which are pivotable relative to each other cam assume a simple shape and because the adjustment of the desired pivotable position thereof requires only a single member which can lie in the interior of one of the elements, the apparatus is also extremely simple and space-saving, and particularly, the outside diameter of the hollow element can be kept small. The apparatus according to the invention can therefore be employed even in very constricted spacial situations.

The transforming of the longitudinal movement of the setting member into a pivotal movement takes place in an advantageous manner in that at least one of the two guides which are form-fitted in the pivotal direction which stems in the shape of a spiral in whose longitudinal axis the axis of rotation lies. The necessary self-locking of this guide is assured by the inclination and the material pulling of the abutting surfaces. Because it is sufficient that one of the two guides extends in the shape of a spiral, in a preferred embodiment the other guide runs parallel to the axis of rotation. This simplifies the shape of the individual elements.

With a view towards a simplest possible manufacture, the setting member, which can be a plastic element, can be provided with the necessary grooves without difficulty. The hollow element with its projections or ribs can be manufactured by massive forming, such as extrusion or swaging, by sheet or tube forming or even by original forming, such as injection molding. It can thus be formed in one piece with the upholstery support of the headrest. The element which engages the hollow element, which engaging elements can be formed by the holder of a headrest, can obtain its shape including the projection or projections by means of massive forming. The guide surfaces do not need to be formed without interruption over the entire length. It is only necessary that the interruptions be shorter than the axial length of the setting member. If the hollow element is not round, the guide for the setting member running parallel to the axis of rotation can be formed by the inner surface of the hollow element. In this manner a further simplification is achieved because of the elimination of projections and grooves.

The end section of the other element which engages the hollow element can lie in a longitudinal channel in the setting member. It thus defines the axis of rotation. One can, however, also do without an axial projection of the element engaging the hollow element or elements and introduce this element or these elements into same through an opening in the cover of the hollow element. In so doing the pivotable mounting of the engaging element can be provided in the interior of the setting member. The dimensions of the opening in the cover of the hollow element must then be adapted in the circumferential direction of the hollow element to the pivoting range. Smaller dimensions of the opening can be obtained if the element passing through the opening is pivotably mounted in the region of the opening.

A control lever is advantageously provided for the longitudinal shifting of the setting member. The arrangement of this control lever can be freely selected over a wide range. A minimal expense can be achieved with an indirect connection of the control lever to a setting member and by passing the control lever through a longitudinal slit in the hollow element. This longitudinal slit can, for manufacturing reasons, also extend over the full length of the hollow element. The position of this type of control lever and accordingly the associated pivotal position can easily be reproduced with the assistance of markings.

BRIEF DESCRIPTION OF THE DRAWINGS

The invention is described in greater detail below with the aid of exemplary embodiments illustrated in the drawings. In the drawings:

FIG. 5 is a perspective view of a second exemplary embodiment;

FIG. 6 is a perspective view of the setting member of the second exemplary embodiment;

FIG. 7 is a perspective view of one of the two rod-like elements of the second exemplary embodiment;

FIG. 8 is a cross section of a third exemplary embodiment;

FIG. 9 is a cross section of a fourth exemplary embodiment.

DETAILED DESCRIPTION OF THE PREFERRED EMBODIMENTS

Figure 1:
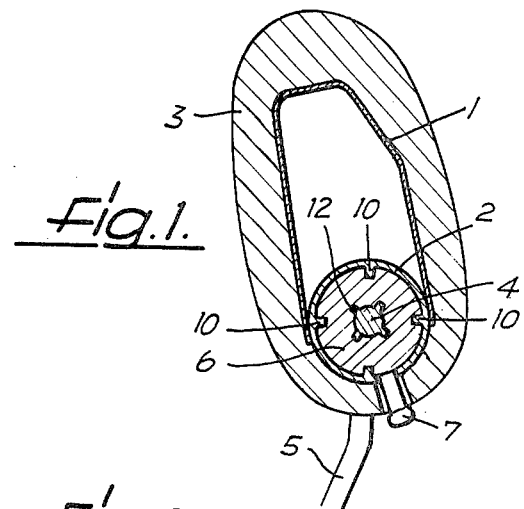
FIG. 1 is a section through a headrest in a first exemplary embodiment.
Figure 2:
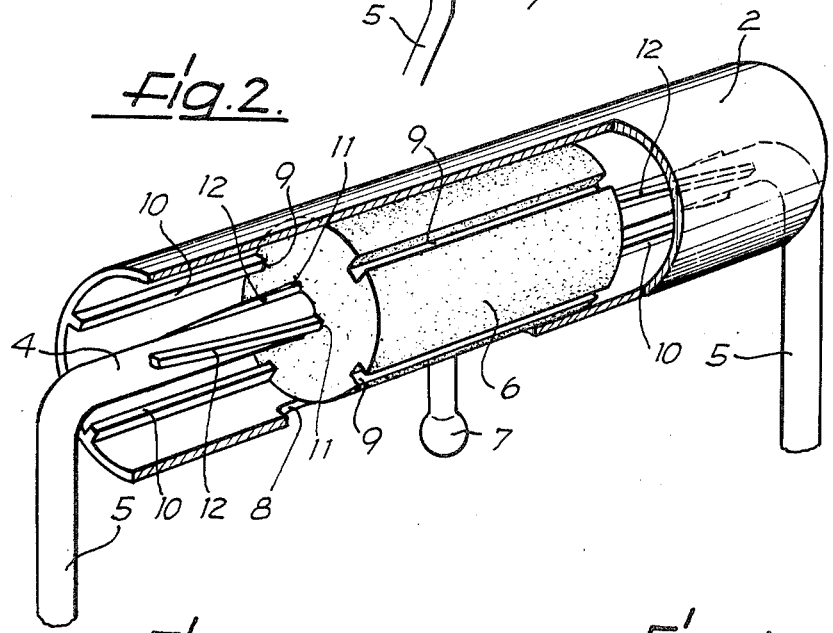
FIG. 2 is a perspective and cut away view of the first exemplary embodiment.
Figure 3:
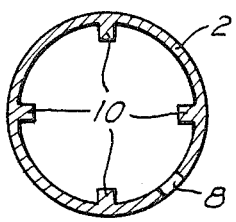
FIG. 3 is a cross section of the hollow element of the first exemplary embodiment.

The upholstery support of a headrest for a vehicle seat consists, as shown in FIG. 1, of a sheet element 1 and a metal tube 2. The sheet element 1 has a U-shaped cross sectional form, and the ends of its two shanks forming the front and back walls lie on diametrically opposite points on the outer surface of the tube 2 and are welded thereto. The sheet element 1 extends beyond the ends of the tube 2 and is partially closed in this area by bent edge portions. An upholstery element 3 covers the upholstery support on all sides.

A cross piece 4 of a hoop-like holder passes through the tube 2. The two parallel shanks of said holder form the two support bars 5, the lower ends of which engage in a mount of the backrest (not shown) of the vehicle seat.

A cylindrical setting element 6 is arranged in the tube 2, which setting member 6 consists in the exemplary embodiment of plastic and whose outside diameter is adapted to the interior diameter of the tube 2 in such a manner that it can easily be moved in the longitudinal direction and can be rotated about the axis of rotation. The axial length of the setting element 6 is smaller than that of the tube 2. In the exemplary embodiment, the setting element 6 is less than half as long as the tube 2. A peg-like grip 7 is placed radially in the setting element 6, passing through a slit 8 in the underside of the upholstery support, i.e., on the side of the tube 2 opposite the sheet element 1. The width of the slit 8 is adapted to the diameter of the grip 7, and its length is adapted to the desired range of movement of the setting element 6 in the axial direction of the tube 2.

The setting element 6 is connected with the tube 2 so as to rotate therewith and yet be movable in the longitudinal direction, by means of a guide which consists of four grooves 9 in the cover of the setting element 6 and of four ledge-like projections 10 on the interior surface of the tube 2. The grooves 9 lie parallel to the axis of rotation of the setting element 6 and are uniformly distributed about the circumference. The ledge-like projections 10 have a corresponding arrangement and embodiment, and are formed in one piece with the tube 2. When the setting element 6 is shifted in a longitudinal direction with the aid of the grip 7 in the tube 2, the pivotal position between the tube and the setting element 6 does therefore not change.

The central bore of the setting element 6, in which the cross piece 4 is mounted so as to be longitudinally movable, has about its periphery in the cover surface four grooves 11 which extend over the entire length of the setting element 6. Each groove 11 has the shape of a spiral, the longitudinal axis of which lies in the longitudinal axis of the central bore. A ledge-like projection 12 of the cross piece 4 engages in each of these grooves 11. The guiding between the setting element 6 and the cross piece 4 is thus comparable to a four-threaded course pitch screw. The pitch of the grooves 11 and projections 12 is selected in such a manner that self-locking is still present, so that a torque exerted on the setting element 6 or the cross piece 4 does not lead to a relative motion in the axial direction of the tube. A shifting of the tube 2 in the axial direction relative to the cross piece 4 is prevented because the length of the tube 2 is adapted to the distance between the two support bars 5.

Figure 4:
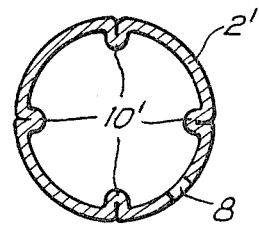
FIG. 4 is a section according to FIG. 3 of a different exemplary embodiment of the hollow element.

The ledge-like projections 12 of the cross piece 4 in the exemplary embodiment are manufactured by massive forming, and those of the tube 2 are manufactured in an extrusion process. As illustrated by FIG. 4, however, one could also employ a tube 2' whose ledge-like projections 10' have been produced by deforming a tube.

When the grip 7 is pushed in the longitudinal direction of the slit 8, the setting element 6 is moved to the same degree relative to the tube 2 and the cross piece 4 in the longitudinal direction thereof. Because of the spiral shape of the guide between the setting element 6 and the cross piece 4, which guide is comprised of the grooves 11 and 12, the above-mentioned longitudinal movement of the setting element 6 forces a rotation of said setting element 6 about the longitudinal axis of the cross piece 4. Because the setting element 6 is rotationally connected with the tube 2, this rotation also results in a corresponding pivoting motion of the sheet element 1 and the upholstery element 3. The setting element 6 together with the grip 7 thus forms not only a setting device but also an adjustment device by means of which the upholstery support and the upholstery element can be steplessly rotated about the longitudinal axis of the cross piece 4 and can be set in the desired rotational position.

Instead of the grip 7 which projects radially from the setting element 6, of course, for example a grip lying parallel to the cross piece 4 could be provided which would be activated from one side of the headrest.

In the second exemplary embodiment shown in FIGS. 5-7, which could be integrated into a headrest like the first exemplary embodiment, one of the two elements which are pivotable relative to each other is also a tube 102. The other element, is not a hoop or stirrup, but rather two identical rods 105, which can be the two support rods of a headrest.

Two cylindrical setting elements 106 and 106' are arranged in the tube 102, which are rigidly connected with each other by means of a connecting bar 113 which lies in their longitudinal axes. Instead of the two setting elements, however, a single setting element could also be provided. The connecting bar 113 is provided with a cross opening 114, into which the one end of a grip 107 is rigidly arranged, which grip passes in a radial direction through a longitudinal slit 108 in the tube 102. The two setting elements 106 and 106' are connected with the tube 102 so as to rotate therewith yet be capable of axial movement relative thereto by means of grooves 109 in the two setting elements 106 and 106' as well as ledge-like projections 110 in the interior wall of the tube 102, which projections 110 engage in the grooves 109. The grooves 109 and the projections 110 have axes that are parallel to each other. A central blind bore 115 penetrates from the free end surfaces into each of the setting elements 106 and 106', and a groove 111 and a longitudinal slit 111', which are arranged diametrically opposite each other, extend over the entire surface of each of the setting elements 106 and 106'. The groove 111 is open toward the blind bore 115. The longitudinal slit 111' passes through the wall of the setting elements 106 and 106'. Both the groove 111 and the longitudinal slit 111' end at a distance from the surface facing the other setting element, as shown in FIG. 6. The two spirals in the two setting elements 106 and 106' defined by the grooves 111 and the longitudinal slits 111' have the same position and the same shape. In addition, the pitch of the spiral is selected in each of them so that one achieves self-locking.

The two identical round rods 105 have a flat pressed, ledge-like ends 105'. In addition, at a distance from the end 105', which is the same as the distance between the groove 111 and the longitudinal slit 111', they are provided with a constricted region 105". This constriction 105" and the ledge-like end 105' of the rod 105 are adapted to the spiral groove 111 and the spiral slit 111'. The end 105' of each of the two round rods 105 engages in the associated groove 111 and the constriction 105" lies in the associated longitudinal slit 111'. The thicker area of the round rod 105 between the constriction 105" and the end 105' prevents a longitudinal shifting of the rod 105 relative to the setting element 106.

The tube 102 is provided with two slits 116 for the passage of the two rods 105, which slits 116 extend in the circumferential direction of the tube 102 to a degree corresponding to the pivot range of the tube 102 relative to the rods 105 and the width thereof is adapted to the diameter of the rods 105. The slits 116 therefore secure the tube 102 against longitudinal shifting relative to the rods 105. The ends 105' and the constrictions 105" of the rods 105 can be achieved by means of stamping.

In the exemplary embodiment according to FIGS. 5-7, a movement of the grip 107 in the longitudinal slit 108 by a freely selectable degree within the range of movement thereof has the result that the two setting elements 106 and 106' are moved to the same degree in the longitudinal direction of the tube 102. Because the groove 111 and the longitudinal slit 111' each run in a spiral whose longitudinal axis lies in the longitudinal axis of the setting elements 106 and 106' and the tube 102, the longitudinal movement of the two setting elements 106 and 106' relative to the rods 105 also results in a rotation of the two setting elements 106 and 106' about their longitudinal axes relative to the rods 105. Because of the rotation-resistant connection with the tube 102, the tube 102 is rotated through the same angle as the setting elements 106 and 106'. The self-locking between the setting elements 106 and 106' on the one hand as well as the rods 105 on the other hand assures that the tube 102 is held in the desired angular position with regard to the rods 105.

As illustrated in the exemplary embodiment according to FIG. 8, a connection between the tube 202 and each of the present setting elements 206 with the aid of grooves and ledge-like projections can be eliminated if the inner surface of the tube 202 borders a nonround surface. In the exemplary embodiment, the tube 202 has a rectangular cross section. The setting element 206 is adapted to this cross section. Instead of a rectangular tube, an oval tube could also be used, for example. Depressions 217 in the outer surface of the setting elements 206 decrease the friction between said setting element 206 and the tube 202, which friction is caused by contacting surfaces which are not completely parallel. A contact between the setting element 206 and the inner surface of the tube 202 therefore takes place only in the area of some of the guide surfaces. In other respects this exemplary embodiment is formed like that according to FIGS. 5-7. The rod which engages the setting element 206 is designated as 205. The thick area thereof lying in the interior of the setting element 206 secures it against separation from the tube 202.

While the axis of rotation lies in the center of the tube in the exemplary embodiments described thus far, in the exemplary embodiment according to FIG. 9 it lies in the wall of the tube 302. The lateral tube 302 has a rectangular cross section, but an arrangement of the axis of rotation in the tube wall is also possible with other cross sections.

The element which is pivotable relative to the tube 302 in this exemplary embodiment consists, as in the exemplary embodiments according to FIGS. 5-8, of two parallel rods 305 arranged at a distance from each other, which can for example take the form of the support rods of a headrest. The rods 305 penetrate in an axial direction into the tube 302, which is provided for this purpose with a bore in its side wall for each rod 305, and a collar 318 made of hard elastic material is placed in said bore. This collar 318 engages in an annular groove 319 of the round rod 305 and thereby mounts said round rod 305 so as to be pivotable about a pivot axis lying in the wall of the tube 302 and running in a right angle to its longitudinal axis. In addition, the collar 318 and the annular groove 319 as well as the thicker area of the rod 305 lying between the annular groove 319 and the ledge-like end 305' prevent the rod from moving in a longitudinal direction relative to the tube 302.

The stamp, ledge-like end 305' of each rod 305 engages in an annular groove 311 of a setting element 306 which, as in the other exemplary embodiments, consists of plastic and is placed in the tube 302. The rectangular setting element 306 lies in a longitudinal movable manner on both side walls of the tube 302 and, as FIG. 9 illustrates, leaves a large portion of the interior space of the tube 302 free. In this manner the end section of the rod 305 projecting into the tube 302 can freely pivot about the axis of rotation lying in the tube wall.

The groove 311 in the setting element 306 runs along a spiral, the longitudinal axis of which coincides with the axis of rotation. A longitudinal movement of the setting element 306, in the tube 302 by means of a grip (not shown) or the like therefore effects a pivotal movement of the same about the axis of rotation and, because of the adaptation of the setting element 306 to the nonround shape of the tube 302, also effects a corresponding movement of the tube 302 relative to the rod 306.

I claim:
1. Device for setting elements which are pivotable relative to each other, especially for setting the pivotable upholstery support of a headrest for vehicle seats, comprising:
   a first element formed as a pipe-like hollow tube;
   a second element engaged with said first element and formed as at least one rod-like support bar;
   a setting member arranged in said first element so as to be longitudinally movable therein;
   an activator device associated with said setting member to form an adjusting device; and
   guide means for engaging said second element with said first element;
   whereby a forced pivotal motion of at least one of the first and second elements relative to the other is produced when the setting member is moved by the activator device in the longitudinal direction of the first element relative thereto.

2. Device according to claim 1, wherein said guide means comprise at least two guides and characterized in that at least one of the two guides, which are form-fitted in the direction of rotation, extends in a spiral, in whose longitudinal axis lies the axis of rotation.

3. Device according to claim 2, characterized in that one of the two guides runs parallel to the axis of rotation.

4. Device according to claim 3, characterized in that at least one of the two guides is formed by at least one groove and by at least a number of projections, which number corresponds to the number of grooves.

5. Device according to claim 4, characterized in that the at least one groove is provided in the setting member.

6. Device according to claim 4, characterized in that at least some of the number of projections are formed on the first element and are formed as ribs.

7. Device according to claim 6, characterized in that an end portion of the second element engaged in the first element lies wholly within said first element.

8. Device according to claim 3, characterized in that the guide running parallel to the axis of rotation is formed by an inner cover surface of the first element and by at least part of an outer cover surface of the setting member.

9. Device according to claim 1, characterized in that an end portion of the second element engaged in the first element lies in a longitudinal channel of the setting member.

10. Device according to claim 9, characterized in that the setting member has an opening for the second element engaged in the first element, said opening located in a wall between an outer cover surface and the longitudinal channel of said setting member towards which the guide means for the second element is open, and said opening also being directed toward an opening in a side of a cover of the first element.

11. Device according to claim 1, characterized in that the second element engages with the first element through an opening in a side of a cover of said first element and is pivotably mounted in a wall area of said opening.

12. Device according to claim 11, characterized in that the setting member lies at a distance from the wall area containing the opening in the side of the cover of the first element and further characterized in that the guide means receives an end portion of the second element introduced through the opening and is opened toward an outer cover surface of the setting member lying opposite the opening in the side of the cover of the first element.

* * * * *

UNITED STATES PATENT AND TRADEMARK OFFICE
CERTIFICATE OF CORRECTION

PATENT NO. : 4,190,290
DATED : February 26, 1980
INVENTOR(S) : Werner Strien

It is certified that error appears in the above-identified patent and that said Letters Patent are hereby corrected as shown below:

Column 1, line 39, change "cam" to --can--;

Column 8, line 1, after "opening" insert --being--.

Signed and Sealed this

First Day of July 1980

[SEAL]

Attest:

SIDNEY A. DIAMOND

Attesting Officer    Commissioner of Patents and Trademarks